(12) United States Patent
Li et al.

(10) Patent No.: US 12,091,015 B2
(45) Date of Patent: Sep. 17, 2024

(54) METHOD AND DEVICE FOR MERGING A VEHICLE FROM A BRANCH ROAD INTO A MAIN ROAD, ELECTRONIC DEVICE, AND STORAGE MEDIUM

(71) Applicants: CHINA INTELLIGENT AND CONNECTED VEHICLES (BEIJING) RESEARCH INSTITUTE CO., LTD., Beijing (CN); Tsinghua University, Beijing (CN)

(72) Inventors: Keqiang Li, Beijing (CN); Wenbo Chu, Beijing (CN); Qiuchi Xiong, Beijing (CN); Qiqige Wuniri, Beijing (CN); Guanfu Huang, Beijing (CN); Dalong Fang, Beijing (CN); Xiaoping Du, Beijing (CN)

(73) Assignee: CHINA INTELLIGENT AND CONNECTED VEHICLES (BEIJING) RESEARCH INSTITUTE CO., LTD., Beijing (CN)

(*) Notice: Subject to any disclaimer, the term of this patent is extended or adjusted under 35 U.S.C. 154(b) by 351 days.

(21) Appl. No.: 17/623,858

(22) PCT Filed: May 27, 2021

(86) PCT No.: PCT/CN2021/096318
§ 371 (c)(1),
(2) Date: Dec. 29, 2021

(87) PCT Pub. No.: WO2022/121249
PCT Pub. Date: Jun. 16, 2022

(65) Prior Publication Data
US 2023/0256969 A1    Aug. 17, 2023

(30) Foreign Application Priority Data

Dec. 11, 2020    (CN) .......................... 202011440192.X

(51) Int. Cl.
*B60W 30/00*    (2006.01)
*B60W 30/18*    (2012.01)
*B60W 40/04*    (2006.01)

(52) U.S. Cl.
CPC ...... *B60W 30/18163* (2013.01); *B60W 40/04* (2013.01); *B60W 2552/05* (2020.02);
(Continued)

(58) Field of Classification Search
CPC .......... B60W 30/18163; B60W 40/04; B60W 2552/05; B60W 2552/10;
(Continued)

(56) References Cited

U.S. PATENT DOCUMENTS 3,304,539 A * 2/1967 Auer, Jr. ................ G08G 1/075
340/920
6,115,652 A * 9/2000 Sato .................... B60W 60/001
701/28
(Continued)

FOREIGN PATENT DOCUMENTS

CN    104464317 A * 3/2015 ............. G08G 1/166
CN    105761549 A    7/2016
(Continued)

OTHER PUBLICATIONS

Rios-Torres, J et al. "Automated and Cooperative Vehicle Merging at Highway On-Ramps," in IEEE Transactions on Intelligent Transportation Systems, vol. 18, No. 4, pp. 780-789, Apr. 2017 [online], [retrieved on Jun. 14, 2024]. Retrieved at <URL: https://ieeexplore.ieee.org/abstract/document/7534837> (Year: 2017).*
(Continued)

*Primary Examiner* — Peter D Nolan
*Assistant Examiner* — Peter Y Ning

(57) ABSTRACT

The present application provides a method and device for merging a vehicle from a branch road into a main road, an
(Continued)

electronic device, and a storage medium, which relates to a technical field of unmanned driving. The method for merging the vehicle from the branch road into the main road includes: acquiring vehicle information of the vehicle to be merged from the branch road into the main road; acquiring traffic flow information of an outer lane of the main road within a preset range of a junction; controlling the vehicle to be merged into the main road to merge into the main road according to the preset rules based on the traffic flow information of the outer lane of the main road and the vehicle information of the vehicle to be merged into the main road.

9 Claims, 5 Drawing Sheets

(52) U.S. Cl.
CPC . *B60W 2552/10* (2020.02); *B60W 2554/4041* (2020.02); *B60W 2554/4042* (2020.02); *B60W 2554/4049* (2020.02)

(58) Field of Classification Search
CPC . B60W 2554/4041; B60W 2554/4042; B60W 2554/4049; B60W 60/001; B60W 2554/406; G08G 1/0104; G08G 1/052; G08G 1/065; G08G 1/07
See application file for complete search history.

(56) References Cited

U.S. PATENT DOCUMENTS

| | | | | |
|---|---|---|---|---|
| 10,293,819 | B1* | 5/2019 | El-Khatib | B60W 60/00274 |
| 2016/0375906 | A1* | 12/2016 | Jeon | B60W 30/182 |
| | | | | 701/54 |
| 2017/0369055 | A1* | 12/2017 | Saigusa | G08G 1/096775 |
| 2019/0318492 | A1* | 10/2019 | Kim | B60W 50/00 |
| 2020/0327812 | A1* | 10/2020 | Ran | G08G 1/096783 |

FOREIGN PATENT DOCUMENTS

| | | | | |
|---|---|---|---|---|
| CN | 106274905 A | | 1/2017 | |
| CN | 106601002 A | | 4/2017 | |
| CN | 110379193 A | | 10/2019 | |
| CN | 110853378 A | | 2/2020 | |
| CN | 110930697 A | | 3/2020 | |
| CN | 111091721 A | | 5/2020 | |
| CN | 111243296 A | * | 6/2020 | ............ G08G 1/075 |
| CN | 112614340 A | | 4/2021 | |

OTHER PUBLICATIONS

Bevly D et al., "Lane Change and Merge Maneuvers for Connected and Automated Vehicles: A Survey," in IEEE Transactions on Intelligent Vehicles, vol. 1, No. 1, pp. 105-120, Mar. 2016 [online], [retrieved on Jun. 14, 2024]. Retrieved at <URL: https://ieeexplore.ieee.org/document/7515222> (Year: 2016).*
Liang Qiao et al., "Autonomous Driving R amp Merging Model Based on Reinforcement Learning", Computer Engineering vol. 44, No. 7, Jul. 2018.
Office Action dated Aug. 20, 2021 for Chinese Application No. 202011440192.X.
Pin Wang et al., "Formulation of Deep Reinforcement Learning Architecture Toward Autonomous Driving for On-Ramp Merge", Oct. 2017, Berkeley, US.
Chiyu Dong et al., "Intention Estimation For Ramp Merging Control In Autonomous Driving", Jun. 2017.
International Search Report dated Sep. 1, 2021 for Application No. PCT/CN2021/096318.

* cited by examiner

METHOD AND DEVICE FOR MERGING A VEHICLE FROM A BRANCH ROAD INTO A MAIN ROAD, ELECTRONIC DEVICE, AND STORAGE MEDIUM

CROSS-REFERENCE TO RELATED APPLICATION

This application is a National Stage of International Application No. PCT/CN2021/096318 filed on May 27, 2021, which claims priority to Chinese Patent Application No. 202011440192.X entitled "METHOD AND DEVICE FOR MERGING A VEHICLE FROM A BRANCH ROAD INTO A MAIN ROAD, ELECTRONIC DEVICE, AND STORAGE MEDIUM" and filed on Dec. 11, 2020, both of which are hereby incorporated by reference in their entireties.

TECHNICAL FIELD

This application relates to a technical field of unmanned driving, and in particular, to a method and device for merging a vehicle from a branch road into a main road, an electronic device, and a storage medium.

BACKGROUND

With a continuous growth of vehicle ownership, traffic accidents occur frequently and congestion is very serious, especially at a ramp junction.

When the vehicle density in an expressway is high, unreasonable avoidance of vehicles on the main road at the junction and unreasonable merging behavior of vehicles on the ramp often lead to traffic accidents, causing the junction to become a traffic jam point.

SUMMARY

The embodiments of the present application is to provide a method for merging a vehicle from a branch road into a main road.

According to the embodiments of a first aspect of the present application, a method for merging a vehicle from a branch road into a main road is provided. The method includes:
  acquiring vehicle information of the vehicle to be merged from the branch road into the main road;
  acquiring traffic flow information of an outer lane of the main road within a preset range of a junction;
  controlling the vehicle to be merged into the main road to merge into the main road based on the traffic flow information of the outer lane of the main road and the vehicle information of the vehicle to be merged into the main road.

According to the embodiments of a second aspect of the present application, a device for merging a vehicle from a branch road into a main road is provided. The device includes:
  an acquisition module configured to acquire vehicle information of the vehicle to be merged from the branch road into the main road;
  the acquisition module further configured to acquire traffic flow information of an outer lane of the main road within a preset range of a junction;
  a control module configured to control the vehicle to be merged into the main road to merge into the main road based on the traffic flow information of the outer lane of the main road and the vehicle information of the vehicle to be merged into the main road.

According to the embodiments of a third aspect of the present application, an electronic device is provided. The electronic device includes:
  a processor;
  a memory storing commands executable by the processor, wherein the processor is configured to execute the commands to implement steps of the method for merging a vehicle from a branch road into a main road according to the embodiments of the first aspect.

According to the embodiments of a fourth aspect of the present application, a storage medium is provided. The storage medium has commands stored thereon, wherein the commands, when executed by a processor of an information processing device or a server, cause the information processing device or the server to implement steps of the method for merging a vehicle from a branch road into a main road according to the embodiments of the first aspect.

BRIEF DESCRIPTION OF THE DRAWINGS

In order to explain the technical solutions in the embodiments of the present application or the prior art more clearly, the drawings that need to be used in the description of the embodiments or the prior art will be briefly introduced in the following. Obviously, the drawings in the following description are some embodiments of the present application. For those of ordinary skill in the art, other drawings can be obtained based on these drawings without creative work.

DETAILED DESCRIPTION

In order to enable those of ordinary skill in the art to better understand the technical solution of the present application, the technical solution in the embodiments of the present application will be described clearly and completely in conjunction with the accompanying drawings.

It should be noted that the terms "first" and "second" in the specification and claims and the above-mentioned drawings of the present application are used to distinguish similar objects, and are not necessarily used to describe a specific sequence or order. It should be understood that the data used in this way can be interchanged under appropriate circumstances, so that the embodiments of the present application described herein can be implemented in a sequence other than those illustrated or described herein. The implementations described in the following exemplary embodiments do not represent all implementations consistent with the present application. On the contrary, they are merely examples of devices and methods consistent with some aspects of the present application as detailed in the appended claims.

Figure 1:
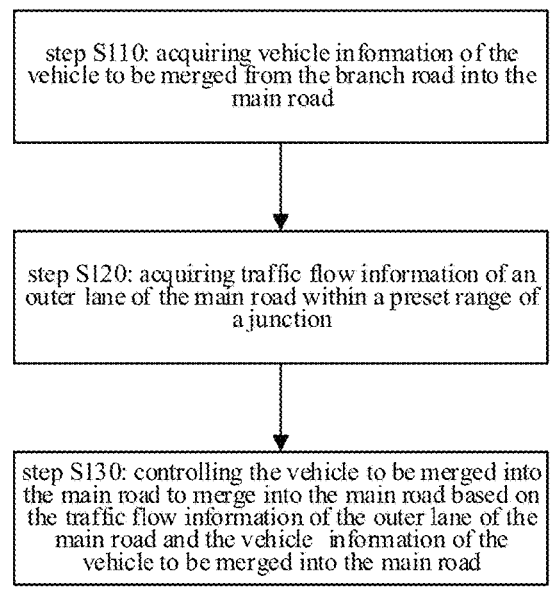
FIG. 1 is a schematic flowchart of a method for merging a vehicle from a branch road into a main road according to an embodiment of the present application.

FIG. 1 is a schematic flowchart of a method for merging a vehicle from a branch road into a main road according to an embodiment of the present application. As shown in FIG. 1, the method for merging the vehicle from the branch road into the main road includes:

step S110: acquiring vehicle information of the vehicle to be merged from the branch road into the main road;

step S120: acquiring traffic flow information of an outer lane of the main road within a preset range of a junction;

step S130: controlling the vehicle to be merged into the main road to merge into the main road based on the traffic flow information of the outer lane of the main road and the vehicle information of the vehicle to be merged into the main road.

According to the method in the above embodiment, the unreasonable merging behaviors of the vehicles caused by human misoperations are prevented, the occurrence of the traffic accidents at the junction is avoided, and the problem of traffic congestion at the junction is effectively solved.

The specific implementations of step S110, step S120, and step S130 are respectively introduced below.

Firstly, the specific implementation of step S110 is introduced.

In the embodiments of the present application, in step S120, the traffic flow information of the outer lane of the main road comprises: gap information of vehicles in the outer lane of the main road and speed information of the vehicles in the outer lane of the main road.

In the embodiments of the present application, in step S130, controlling the vehicle to be merged into the main road to merge into the main road based on the traffic flow information of the outer lane of the main road and the vehicle information of the vehicle to be merged into the main road includes:

judging the gap information of the vehicles in the outer lane of the main road;

controlling the vehicles in the outer lane of the main road and the vehicle to be merged into the main road based on the judging result, so as to merge the vehicle to be merged into the main road into the main road.

In the embodiments of the present application, controlling the vehicles in the outer lane of the main road and the vehicle to be merged into the main road based on the judging result, so as to merge the vehicle to be merged into the main road into the main road includes:

controlling, under a condition that the gaps of the vehicles in the outer lane of the main road is greater than or equal to a preset safe merging gap, the vehicles in the outer lane of the main road to keep driving at a constant speed, and controlling the vehicle to be merged into the main road to merge into the main road at the speed of the vehicles in the outer lane of the main road.

In the embodiments of the present application, controlling the vehicles in the outer lane of the main road and the vehicle to be merged into the main road based on the judging result, so as to merge the vehicle to be merged into the main road into the main road further includes:

acquiring, under a condition that the gaps of the vehicles in the outer lane of the main road is less than the preset safe merging gap, gap information of vehicles in an inner lane of the main road;

controlling, under a condition that the gaps of the vehicles in the inner lane of the main road is greater than or equal to a preset safe lane changing gap, the vehicles in the outer lane of the main road to change into the inner lane of the main road, and controlling the vehicle to be merged into the main road to merge into the main road at a speed of the vehicles in the outer lane of the main road.

In the embodiments of the present application, controlling the vehicles in the outer lane of the main road and the vehicle to be merged into the main road based on the judging result, so as to merge the vehicle to be merged into the main road into the main road further includes:

controlling, under a condition that the gaps of the vehicles in the outer lane of the main road is greater than or equal to N (N is an integer greater than 1) times a preset safe merging gap, the vehicles in the outer lane of the main road to keep driving at a constant speed, and controlling N vehicles to be merged into the main road to merge into the main road in platoon at the speed of the vehicles in the outer lane of the main road.

In the embodiments of the present application, the vehicle information of the vehicle to be merged into the main road further comprises: speed information of the vehicle to be merged into the main road, driving type of the vehicle to be merged into the main road, and a distance between the vehicle to be merged into the main road and the junction;

the traffic flow information of the outer lane of the main road further includes: driving types of vehicles in the outer lane of the main road;

the method further includes:

calculating a time of the vehicle to be merged into the main road arriving at the junction according to the speed information of the vehicle to be merged into the main road and the distance between the vehicle to be merged into the main road and the junction;

calculating a scheme of merging the vehicle from the branch road into the main road with a minimum energy consumption according to the time of arriving at the junction, the speed information of the vehicle to be merged into the main road, the drive type of the vehicle to be merged into the main road, the drive types of the vehicles in the outer lane of the main road, and the speed of the vehicles in the outer lane of the main road.

Figure 2:
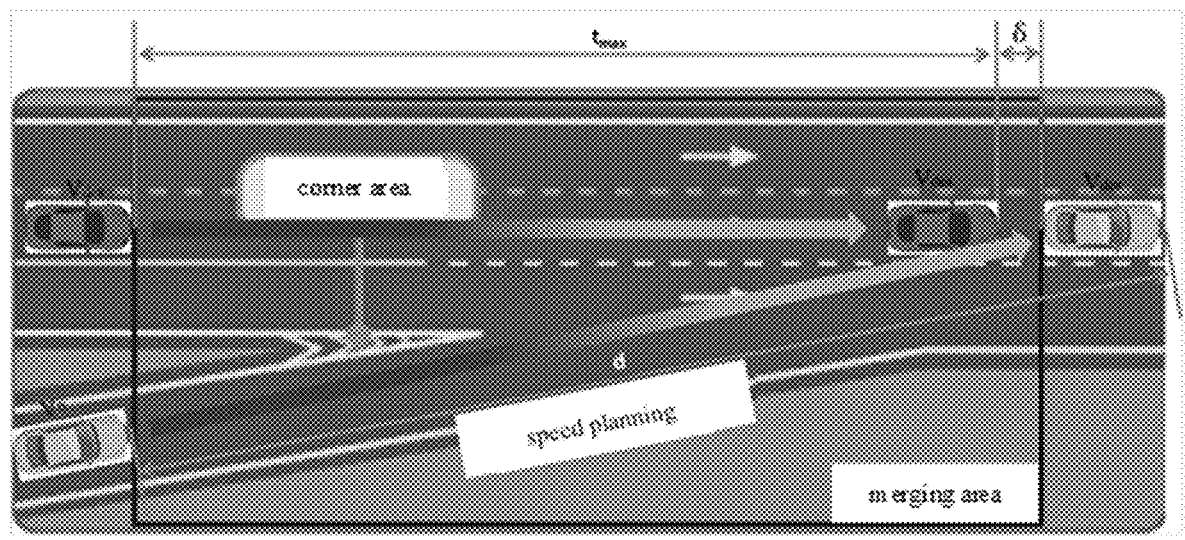
FIG. 2 is a schematic diagram of a road condition for merging a vehicle from a branch road into a main road according to an embodiment of the present application.
Figure 3:
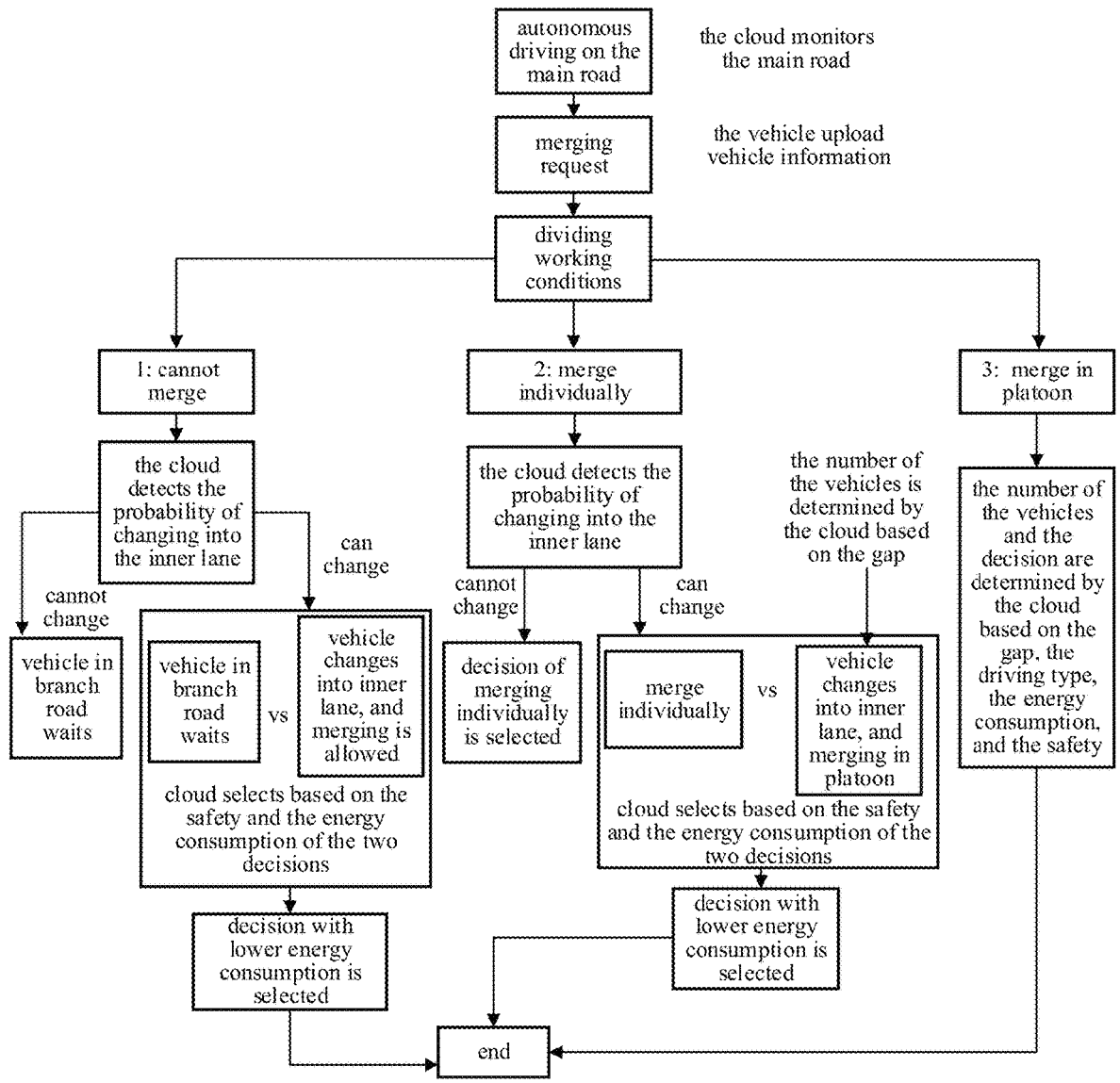
FIG. 3 is a schematic flowchart of another method for merging a vehicle from a branch road into a main road according to an embodiment of the present application.

In the above embodiments, safety and economy are comprehensively considered to increase the road utilization rate and the energy consumption economy of the vehicles in the scene of merging the vehicles, and to simplify the control complexity. As shown in FIG. 2, the specific application scenario of this embodiment is a ramp junction where the main road and the branch road meet. As shown in FIG. 3, the method may include the followings.

The ramp junction is configured with a central controller that can be connected to the cloud. The central controller is configured with real-time vehicle-road communication function and can cover the entire ramp junction and the lanes of the main road. Under a condition that there is no vehicle entering from the ramp, the central controller monitors the traffic flow information of each lane of the main road in real-time, including information such as traffic advancing speed, dynamic distances between vehicles in the same lane, etc., and controls the vehicles in the main road to drive orderly and automatically. The control goal for the vehicles on the main road is to avoid merging as much as possible, keep driving at a constant speed, and drive in platoon with a constant gap, so as to avoid congestion.

Under a condition that the vehicle in the branch road enters into the signal coverage of the central controller, the vehicle sends a merging request signal. At the same time, the vehicle to be merged from the branch road into the main road sends its driving type, speed, acceleration, and position information. The central controller decides whether to merge and whether to merge in platoon according to the vehicle following conditions of the vehicle to be merged from the branch road into the main road (vehicle gap, vehicle speed, traffic flow gap at the junction) and the traffic flow conditions of the outer lane of the main road (vehicle gap, vehicle speed). The working conditions can be divided into three conditions.

In working condition 1, the traffic flow of the outer lane of the main road is tight, the traffic flow gap is too small (less than a length of the vehicle $h_{car}$+a safe distance between vehicles $\delta$), and the vehicle cannot be merged;

In working condition 2, according to the traffic flow gap of the outer side of the main road (greater than $h_{car}+\delta$, but less than $2(h_{car}+\delta)$), a single vehicle is allowed to merge;

In working condition 3, the traffic flow gap of the outer lane of the main road is large (greater than or equal to $2(h_{car}+\delta)$), and merging in platoon can be adopted.

The vehicles in the outer lane of the main road drive in platoon at a constant speed based on a driving strategy in the cloud as much as possible, so as to improve energy consumption economy. Under a condition that a merging collision of the vehicle in the branch road may occur (due to a cloud decision error), the on-board ACC systems of the vehicles in the outer lane of the main road at the junction are responsible for emergency avoidance decision, so as to avoid the collision by the vehicles themselves according to the two decision modes such as acceleration and deceleration. After the vehicle in the branch road enters into the main road, the vehicle drives at a constant speed such as a speed limit $v_{des}$ of the main road. The avoided vehicle follows according to the on-board ACC system, and the traffic flow of the main road is restored.

In working condition 1, the central controller detects the traffic flow conditions of the inner lane of the main road. Under a condition that the traffic flow gap is small (less than the length of the vehicle $h_{car}$+the safe distance between vehicles $\delta$), the vehicles in the outer lane are not controlled to change into the inner lane, and the vehicle in the branch road is controlled to wait for a next merging opportunity in the ramp. Under a condition that the traffic flow gap in the inner lane of the main road is large (greater than $h_{car}+\delta$), the vehicles in the outer lane of the main road are controlled to change into the inner lane by a single vehicle or in platoon according to the gap size, and the vehicle in the branch road is allowed to merge. Considering the principle of energy consumption optimization, in the present application, the merging of the vehicles in the main road is controlled by the cloud as a merging operation at constant speed, that is, only steering operation is performed, and no acceleration/deceleration operation is performed. In this planning, the total energy consumption of all vehicles on the main road and the branch road participating in the merging and lane changing behaviors in this planning scenario is calculated, and is compared with the total energy consumption of participating vehicles in a scenario where the vehicle in the branch road is waiting in the ramp. The plan with lower energy consumption is chosen for control implementation.

In working condition 2, the central controller detects the traffic flow conditions of the inner lane of the main road. Under a condition that the traffic flow gap is small (less than the length of the vehicle $h_{car}$+the safe distance between vehicles $\delta$), the vehicles in the outer lane are not controlled to change into the inner lane, and the vehicle in the branch road is controlled to adopt a single vehicle merging strategy. The optimization of the strategy is determined according to the driving type of the vehicle to be merged (which determines the energy consumption optimization method), the merging distance d, the merging time t, and the speed $v_{des}$ at the end of the merging behavior. Under a condition that the traffic flow gap in the inner lane of the main road is large (greater than $h_{car}+\delta$), the vehicles in the outer lane of the main road are controlled to change into the inner lane individually or in platoon according to the gap size, and the vehicle in the branch road is allowed to merge. In this planning, the available gap in the outer lane is acquired according to the number of vehicles in the outer lane of the main road that change into the inner lane, so as to determine the number of vehicles to be merged from the branch road into the main road. In this planning strategy, the total energy consumption of all vehicles on the main road and the branch road participating in the merging and lane changing behaviors in this planning scenario is calculated, and is compared with the total energy consumption of participating vehicles in a scenario where the vehicles in the outer lane of the main road are not merged and the vehicle in the branch road is merged by a single vehicle. The plan with lower energy consumption is chosen for control implementation.

In working condition 3, the traffic flow gap of the outer lane of the main road is large (greater than or equal to $2(h_{car}+\delta)$), and merging in platoon can be considered. At this time, the lane changing operation of the vehicles on the main road is not considered, so as to reduce the control complexity. According to the speed and position information of the vehicle nearest to the junction in the outer lane of the main road, a time $t_{max}$ of the vehicle arriving at the junction is calculated by the cloud (in order to avoid collisions, this maximum time is a time of the vehicle nearest to the junction in the outer lane of the main road driving from the current position to a position that the head of the vehicle is beyond the border of the merging area by a safe distance $\delta$). The cloud measures a distance d from the leading vehicle to the junction according to the vehicle speed, distance between vehicles, position information, and leading vehicle information within the signal range of the branch road. The cloud is responsible for considering the number of the vehicles in platoon and the planning of the merging speed of the leading vehicle. According to the vehicle coordinate information, the cloud can calculate a length h of the motorcade. According to the distance d from the leading vehicle to the junction, the final vehicle speed $v_{des}$ after the merging behavior, and the maximum merging time $t_{max}$, the cloud can calculate the merging feasibility in platoon under a different length h of the motorcade. The feasible platoon lengths are summarized, and the longest platoon length is selected to determine the number of vehicles in platoon. The best speed curve of the leading vehicle is then optimized according to the energy consumption of the leading vehicle, and the leading vehicle is controlled to lead the motorcade to merge into the main road.

Figure 4:
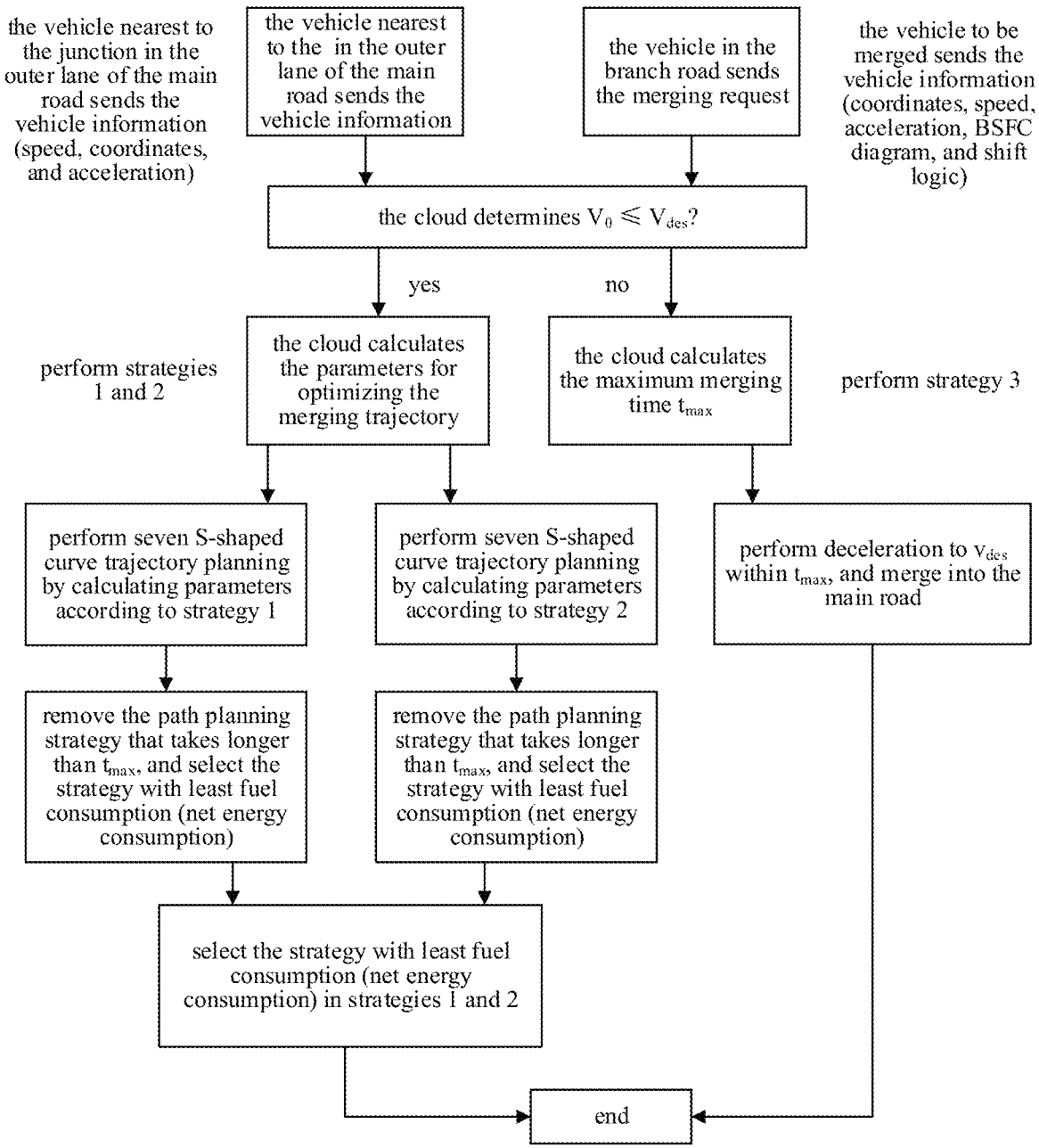
FIG. 4 is a schematic flowchart of a method for merging vehicles of different driving types from a branch road into a main road according to an embodiment of the present application.

As shown in FIG. 4, the driving types of the vehicles need to be considered as an indicator. The driving types of the vehicles are divided into three types, such as gasoline, hybrid and electric.

There are two feasible strategies in the merging condition for a single vehicle. Assuming that the traffic flow speed of the outer lane of the main road is $v_{des}$, the vehicle in the branch road sends the position information, and the cloud measures the distance of the vehicle completely passing through the junction is d. During the vehicle to be merged driving through the distance d, three possible strategies will be implemented: 1, accelerating first, and then decelerating; 2, directly accelerating to $v_{des}$; 3, directly decelerating to $v_{des}$.

The choice of strategies is determined by the conditions of the vehicles entering into the junction from the outer lane of the main road and the branch road at the same time. Avoiding collisions is the first goal. The cloud calculates the time $t_{max}$ of arriving at the junction based on the speed and location information of the vehicles on the main road, and determines that in which mode the vehicles to be merged from the branch road will merge within a time less than $t_{max}$, so as to avoid collisions. Secondly, energy consumption economy is the second goal, and is used to optimize the planning speed curve for the two feasible merging strategies. As gasoline vehicles, electric vehicles, and hybrid vehicles have different structures, the energy optimization methods are different. Therefore, the optimization methods should be considered separately according to the drive types of the vehicles.

The optimization method for gasoline vehicles is described in the followings.

For the gasoline vehicles, the fuel consumption of the engine is generally determined by the torque and rotate speed of the engine, and its fuel consumption characteristics present extremely non-linear characteristics. Summing up the fuel consumption model based on the speed and acceleration of the vehicle only according to the experimental method cannot completely and accurately reflect the fuel consumption of the vehicle, which affects the optimization results. In addition, the fuel consumption of the vehicle is also related to the throttle opening. Due to the different throttle openings, the torque outputs and rotate speeds of the engine are different, which affects the fuel consumption. The different gears result in the different torque at the wheel end of the same engine torque output, which affects the actual acceleration capability. Since fuel consumption is one of the considered criteria of the cloud planning and merging strategy in the present application, the cloud should receive vehicle power model data and control logic (such as a diagram of the vehicle engine fuel consumption BSFC, a curve diagram of the throttle openings and the torques, an table of the rotate speeds of the engine corresponding to the throttle openings, and a diagram of the shift logic) as the basis for optimization.

$$v_0 \leq v_{des} \quad \text{(working condition 1)}$$

Under a condition that the speed of the vehicle entering the junction is lower than $v_{des}$, the vehicle should implement strategy 1 or strategy 2 according to the maximum time $t_{max}$ of the vehicle merging into the main road and the final speed $v_{des}$ after the merging behavior. In strategies 1 and 2, the cloud divides the areas with lower fuel consumption of the vehicle based on the diagram of the engine BSFC, so as to determine the economic range of the torque outputs and rotate speeds of the engine.

In strategy 1, an S-shaped speed curve planning algorithm of the robot can be used. It includes seven common methods (such as trapezoid, cosine, polynomial, 7-segment S-shape, 7-segment modified S-shape, 15-segment S-shape, 31-segment S-shape). The input parameters are an input distance d, an initial speed $v_0$, a final speed $v_{des}$, a maximum speed $v_{max}$, a maximum acceleration $a_{max}$, a maximum deceleration $a_{min}$, a first derivative of the maximum acceleration $j_{max}$, a second derivative of the maximum acceleration $s_{max}$, and a third derivative of the maximum acceleration $c_{max}$. Each method requires the same input trajectory specific parameters. Integrating the diagram of the engine BSFC, the curve diagram of the throttle openings and the torques, and the table of the rotate speeds of the engine corresponding to the throttle openings, the cloud can determine combinations (operating points) of the torques and the rotate speeds of the engine in all possible economic areas. Since the torque directly affects the acceleration performance of the vehicle, and the operating point at which the engine can work in the economic area has been determined, the upper limit of the economic torque output range is the maximum acceleration torque $T_{max}$ that the vehicle can obtain. The maximum allowable acceleration of the vehicle under economic conditions corresponds to the upper limit $T_{max}$ of the economic torque. The throttle opening can be determined according to the operating point at which the engine can work in the economic area and the curve diagram of the throttle openings and the torques. At this operating point, the wheel end acceleration obtained by the vehicle in each gear is calculated according to the vehicle gear ratio. The maximum wheel end acceleration is chosen as $a_{max}$. $v_{max}$ can be determined by the upper limit of the engine rotate speed range in the economic working area of the engine. The maximum engine rotate speed and the highest gear in the working area are selected to calculate the maximum speed $v_{max}$ at the wheel end. The maximum deceleration $a_{min}$ is the maximum deceleration of the vehicle before the tire locks up. $j_{max}$ is the changing rate of the vehicle acceleration, and this parameter should be determined according to passenger comfort standards. $s_{max}$ and $c_{max}$ can be set to 0, so as to ensure the speed curve is as smooth as possible. The input parameters of the various algorithms of S-shaped path planning have been restricted according to the operating points of the optimal working area of the engine, combining with the subsequent selection of suitable gears, the engine can work in the economic area as far as possible while meeting the requirements of the acceleration at the wheel end. According to the above parameter settings, the cloud calculates the speed curves of the seven methods, and selects the corresponding throttle openings and gears according to the speed curves, so as to make the engine operate in the economic areas as much as possible. By comparing the full path travel time of the seven methods, the paths that take longer than $t_{max}$ are removed. Finally, the total fuel consumption of each method path is calculated, and the minimum fuel consumption plan is selected as the pending strategy for working condition 1.

In strategy 2, since the working condition is considered as a positive acceleration or constant speed mixing scheme, the S-shaped speed curve planning method is used again. Nevertheless, the parameter $v_{max}=v_{des}$, $a_{min}=0$. According to the above parameter settings, the cloud calculates the speed curves of the seven methods, and selects the corresponding gears according to the speed curves, so as to make the engine operate in the economic area as much as possible. By comparing the full path travel time of the seven methods, the paths that take longer than $t_{max}$ are removed. Finally, the total fuel consumption of each method path is calculated, and the minimum fuel consumption plan is selected as the pending strategy for working condition 1.

Comparing the process fuel consumption of the two strategies, the merging strategy for working condition 1 is determined.

$$v_0 > v_{des} \quad \text{(working condition 2)}$$

Under a condition that $v_0 > v_{des}$, since the initial speed of the vehicle is greater than the speed limit of the main road, only the deceleration of strategy 3 is taken, and no fuel is consumed. Therefore, the vehicle can be directly controlled to move at a constant deceleration until it reaches the speed limit $v_{des}$ of the main road after passing through the junction.

The optimization method for hybrid vehicles is described in the followings.

For the hybrid vehicles, the drive system includes an engine and an electric motor. In general, the electric motor, the engine and the wheels are connected by planetary gear sets and variable speed gear sets, and the structure is more complicated than that of the gasoline vehicles. Due to the dual-system drive and the braking energy recovery function, the operation modes are more diverse. For production-level hybrid vehicles, rule-based control systems are often used for mode switching. Therefore, for the hybrid vehicles to be merged from the branch road, in addition to the information that should be uploaded for the gasoline vehicles, the electric motor efficiency diagram and the available operating points, the shift logic of the electric motor, the integrated gear ratio of the hybrid drive system, and the mode switching rules should be uploaded to the cloud. Since the moving scene of the hybrid vehicles is the same as that of the gasoline vehicles, the vehicles also should implement the same three strategies.

$$v_0 \leq v_{des} \quad \text{(working condition 1)}$$

Under a condition that the speed of the vehicle entering the junction is lower than $v_{des}$, the vehicle should implement strategy 1 or strategy 2 according to the maximum time $t_{max}$ of the vehicle merging into the main road and the final speed $v_{des}$ after the merging behavior. The input parameters are an input distance d, an initial speed $v_0$, a final speed $v_{des}$, a maximum speed $v_{max}$, a maximum acceleration $a_{max}$, a maximum deceleration $a_{min}$, a first derivative of the maximum acceleration $j_{max}$, a second derivative of the maximum acceleration $s_{max}$, and a third derivative of the maximum acceleration $c_{max}$. Each method requires the same input trajectory specific parameters. The cloud divides the engine and electric motor economic areas according to the diagram of the engine BSFC and the diagram of the motor efficiency. Since the engine and the electric motor of the hybrid system are in a coupled state, the mode selection problem should be considered. Mode 1 is a fuel-powered mode, that is, the vehicle is only driven by the engine; Mode 2 is a joint driving mode, that is, the vehicle is driven by the engine and the electric motor together; Mode 3 is an electric motor driving mode. Consider the combinations (operating points) of the torques and the rotate speeds of the engine working in the economic areas and the combinations (operating points) of the torques and the rotate speeds of the electric motor working in the economic areas, combining with the corresponding gear rule information in the three modes, the cloud can calculate the upper limit of the torque at the wheel end in each mode. The maximum torque at the wheel end is selected to calculate the maximum acceleration $a_{max}$. According to the upper limit of the economic rotate speed of the engine and the electric motor in the operating points, combining with the comprehensive gear ratio composed of the shift logics in each mode of the hybrid system, the cloud can calculate the maximum speed $v_{max}$ at the wheel end. Since the hybrid vehicles have both the braking energy recovery actuator and the mechanical braking actuator, in order to reduce the net energy consumption during the merging of the vehicle, the braking energy recovery actuator can be used for braking as much as possible. Therefore, the maximum deceleration $a_{min}$ of the vehicle can be set as the maximum braking deceleration of the braking energy recovery actuator. The other parameters are the same as those of the gasoline vehicles. The S-shaped speed planning method has selected the parameters according to the operating rules of the hybrid powertrain and the operating points of the electric motor and the engine in the economic working areas, and the cloud pre-simulates the vehicle information provided above, so as to determine the operation modes and the comprehensive gear ratios that can make the engine and the electric motor operate in the economic area as much as possible. By comparing the full path travel time of the seven methods, the paths that take longer than $t_{max}$ are removed. Finally, the total energy consumption of each method path is calculated (the total energy consumption of the hybrid vehicle includes three parts: the engine fuel consumption, the electric motor power consumption, and the vehicle braking energy feed, and thus the calculation of the total energy consumption should be based on the calculation of net energy consumption), and the minimum energy consumption plan is selected as the pending strategy for working condition 1.

In strategy 2, since the working condition is considered as a positive acceleration or constant speed mixing scheme, the S-shaped speed curve planning method is used again. Nevertheless, the parameter $v_{max} = v_{des}$, $a_{min} = 0$. According to the above parameter settings, the cloud calculates the speed curves of the seven methods, and selects the corresponding modes and comprehensive gear ratios according to the speed curves, so as to make the engine and the electric motor operate in the economic area as much as possible. By comparing the full path travel time of the seven methods, the paths that take longer than $t_{max}$ are removed. Finally, the total energy consumption of each method path is calculated, and the minimum energy consumption plan is selected as the pending strategy for working condition 1.

Comparing the process energy consumption of the two strategies, the merging strategy for working condition 1 is determined.

$$v_0 > v_{des} \quad \text{(working condition 2)}$$

Under a condition that $v_0 > v_{des}$, since the initial speed of the vehicle is greater than the speed limit of the main road, only the deceleration of strategy 3 is taken, and no fuel and electric energy is consumed. Further, it can also feed energy in the case of braking. Therefore, the vehicle can be directly controlled to move at a constant deceleration until it reaches the speed limit $v_{des}$ of the main road after passing through the junction.

The optimization method for electric vehicles is described in the followings.

Due to the large range of the rotate speed and the wide range of the constant torque output of the electric motor, the electric vehicles can be driven directly without a gearbox. Therefore, the torque of the electric motor can directly drive the wheels through a fixed final drive. The structure of the power model of the electric vehicles is simpler than that of the gasoline vehicles. Compared with the hybrid vehicles, the electric vehicles also have a braking energy recovery actuator, and have a larger battery capacity and electric motor power, and thus the energy recovery efficiency can also be integrated into the energy consumption optimization. Therefore, for the electric vehicles, the power information of the vehicles that should be acquired by the cloud includes a diagram of the electric motor efficiency (electric motor and generator dual modes), available operating points (driving and braking dual modes), and a gear ratio. Since the moving scene of the electric vehicles is the same, the vehicles also should implement the same three strategies.

$$v_0 \leq v_{des} \quad \text{(working condition 1)}$$

Under a condition that the speed of the vehicle entering the junction is lower than $v_{des}$, the vehicle should implement strategy 1 or strategy 2 according to the maximum time $t_{max}$ of the vehicle merging into the main road and the final speed $v_{des}$ after the merging behavior. The input parameters are an input distance d, an initial speed $v_0$, a final speed $v_{des}$, a maximum speed $v_{max}$, a maximum acceleration $a_{max}$, a maximum deceleration $a_{min}$, a first derivative of the maximum acceleration $j_{max}$, a second derivative of the maximum acceleration $s_{max}$, and a third derivative of the maximum acceleration $c_{max}$. Each method requires the same input trajectory specific parameters. The cloud selects areas with higher electric motor efficiency in the diagram of the electric motor efficiency as the target electric motor working areas. In the area, the operating points of the electric motor in the economic working areas are determined according to the information of the available operating points. The cloud also selects areas with higher power generation efficiency in the diagram of the generator efficiency as the target power generation working areas. In the area, the operating points of high power generation efficiency are determined according to the information of the operating points of braking energy recovery. In the operating points of the electric motor in the economic working areas, the maximum torque $T_{max}$ of the electric motor and the wheel gear ratio are selected to calculate the upper limit $a_{max}$ of the vehicle acceleration. The maximum speed $v_{max}$ of the vehicle is calculated by the maximum rotate speed corresponding to the maximum economic torque of the motor and the wheel gear ratio. Based on the economic operating points of the generator, the maximum braking torque $T_{min}$ and the wheel gear ratio are selected to calculate the upper limit $a_{min}$ of the vehicle deceleration. Since the sudden braking behavior of the vehicle in the merging scene will seriously affect the comfort and increase the subsequent acceleration energy consumption, the speed curve planning avoids the intervention of mechanical braking as much as possible. So, the maximum deceleration is limited based on the efficiency of the braking energy recovery actuator. The other parameters are the same as the gasoline vehicles and the hybrid vehicles. The S-shaped speed planning method has selected the parameters according to the operating points of the electric motor in the economic working areas, and the cloud uses the vehicle information provided above to perform the path planning of the seven methods and determine the travel time. At the same time, the cloud pre-simulates to predict the net energy consumption (the difference between the driving energy consumption of the electric motor and the energy recovered during braking) of each path planning method. By comparing the full path travel time of the seven methods, the paths that take longer than $t_{max}$ are removed. Finally, the net energy consumption of each method path is calculated, and the minimum net energy consumption plan is selected as the pending strategy for working condition 1.

In strategy 2, since the working condition is considered as a positive acceleration or constant speed mixing scheme, the S-shaped speed curve planning method is used again. Nevertheless, the parameter $v_{max}=v_{des}$, $a_{min}=0$. According to the above parameter settings, the cloud calculates the speed curves of the seven methods. By comparing the full path travel time of the seven methods, the paths that take longer than $t_{max}$ are removed. Finally, the net energy consumption of each method path is calculated, and the minimum net energy consumption plan is selected as the pending strategy for working condition 1.

Comparing the process energy consumption of the two strategies, the merging strategy for working condition 1 is determined.

$$v_0 > v_{des} \quad \text{(working condition 2)}$$

Under a condition when $v_0 > v_{des}$, since the initial speed of the vehicle is greater than the speed limit of the main road, only the deceleration of strategy 3 is taken, and no electric energy is consumed. Further, it can also recover energy in the case of braking. Therefore, the vehicle can be directly controlled to move at a constant deceleration until it reaches the speed limit $v_{des}$ of the main road after passing through the junction.

For the working condition of merging multiple vehicles in platoon, in order to reduce the control complexity, the motorcade is considered as a long-length single vehicle, and only the speed curve of the leading vehicle is planned. The cloud should collect the operating energy consumption information of each vehicle in the motorcade (driving modes of the vehicles, energy consumption optimization control logic, a diagram of the engine BSFC, a diagram of the electric motor efficiency, etc.), so as to perform energy consumption calculations. Since the motorcade can move simultaneously under the control of the cloud, there is no delay of the following. The following vehicles can directly follow the leading vehicle according to the speed curve of the leading vehicle, so as to keep a constant gap. Therefore, the motorcade can be considered as a long-length single vehicle, but the merging distance should be set as a distance traveled by the leading vehicle from the head of the leading vehicle entering into the merging area to the rear of the tail vehicle passing the junction (under a condition when the motorcade is long, its own length h will have a greater impact on the merging distance). According to the principle of equal gap and the same speed curve, the cloud will pre-simulate the merging of the motorcade, remove the strategies in which the vehicles in platoon cannot merge within $t_{max}$, and calculate the total energy consumption of the motorcade at the same time. The total energy consumption of the motorcade under each speed planning method are compared, and the strategy with the smallest total energy consumption is selected for execution.

After the vehicles in the branch road are merged, the vehicles will immediately keep driving at a constant speed $v_{des}$, so as to ensure the smooth operation of the traffic flow of the main road.

Figure 5:
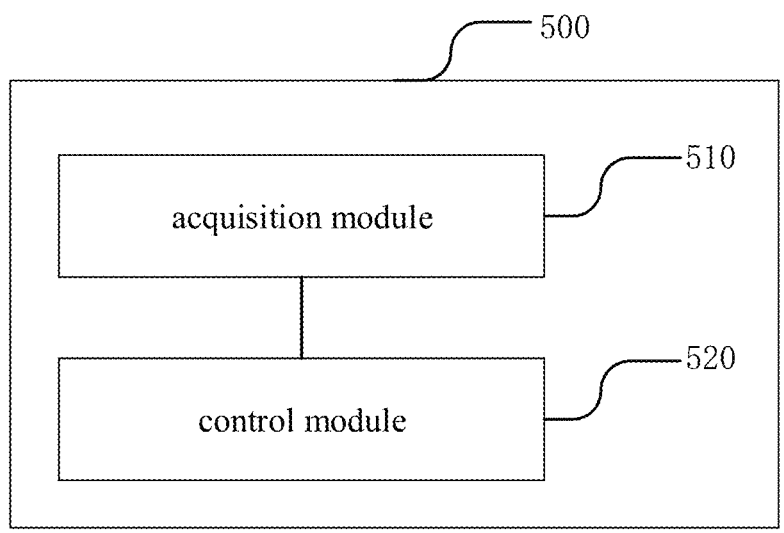
FIG. 5 is a schematic diagram of a structure of a device for merging a vehicle from a branch road into a main road according to an embodiment of the present application.

Based on the same inventive concept, an embodiment of the present application further provides a device 500 for merging a vehicle from a branch road into a main road. As shown in FIG. 5, the device includes:

an acquisition module 510 configured to acquire vehicle information of the vehicle to be merged from the branch road into the main road;

the acquisition module 510 further configured to acquire traffic flow information of an outer lane of the main road within a preset range of a junction;

a control module 520 configured to control the vehicle to be merged into the main road to merge into the main road based on the traffic flow information of the outer lane of the main road and the vehicle information of the vehicle to be merged into the main road.

According to the device in the above embodiment, the acquisition module 510 acquires the vehicle information of the vehicle to be merged from the branch road into the main road; the acquisition module 510 acquires the traffic flow information of the outer lane of the main road within the preset range of the junction; and the control module 520 controls the vehicle to be merged into the main road to merge into the main road according to the preset rules based on the traffic flow information of the outer lane of the main road and the vehicle information of the vehicle to be merged into the main road. According to the device, the unreasonable merging behaviors of the vehicles caused by human misoperations are prevented, the occurrence of the traffic accidents at the junction is avoided, and the problem of traffic congestion at the junction is effectively solved.

Figure 6:
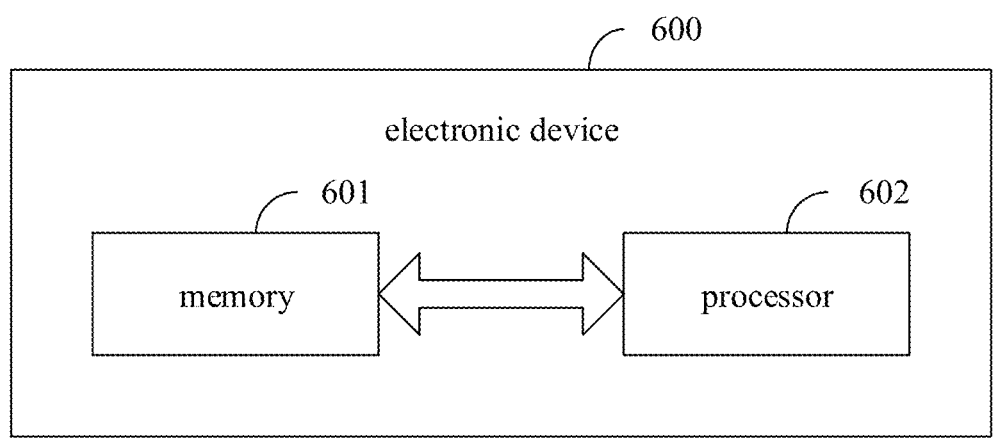
FIG. 6 is a schematic diagram of a structure of an electronic device according to an embodiment of the present application.

Optionally, as shown in FIG. 6, an embodiment of the present application further provides an electronic device 600, including a processor 601, a memory 602 storing programs or commands executable by the processor 601, wherein the programs or commands, when executed by the processor 601, implement each process of the method for merging the vehicle from the branch road into the main road in the above embodiments, and the same technical effect can be achieved. In order to avoid repetition, details are not repeated here.

It should be noted that the electronic device in the embodiments of the present application includes the above mobile electronic device and non-mobile electronic device.

Figure 7:
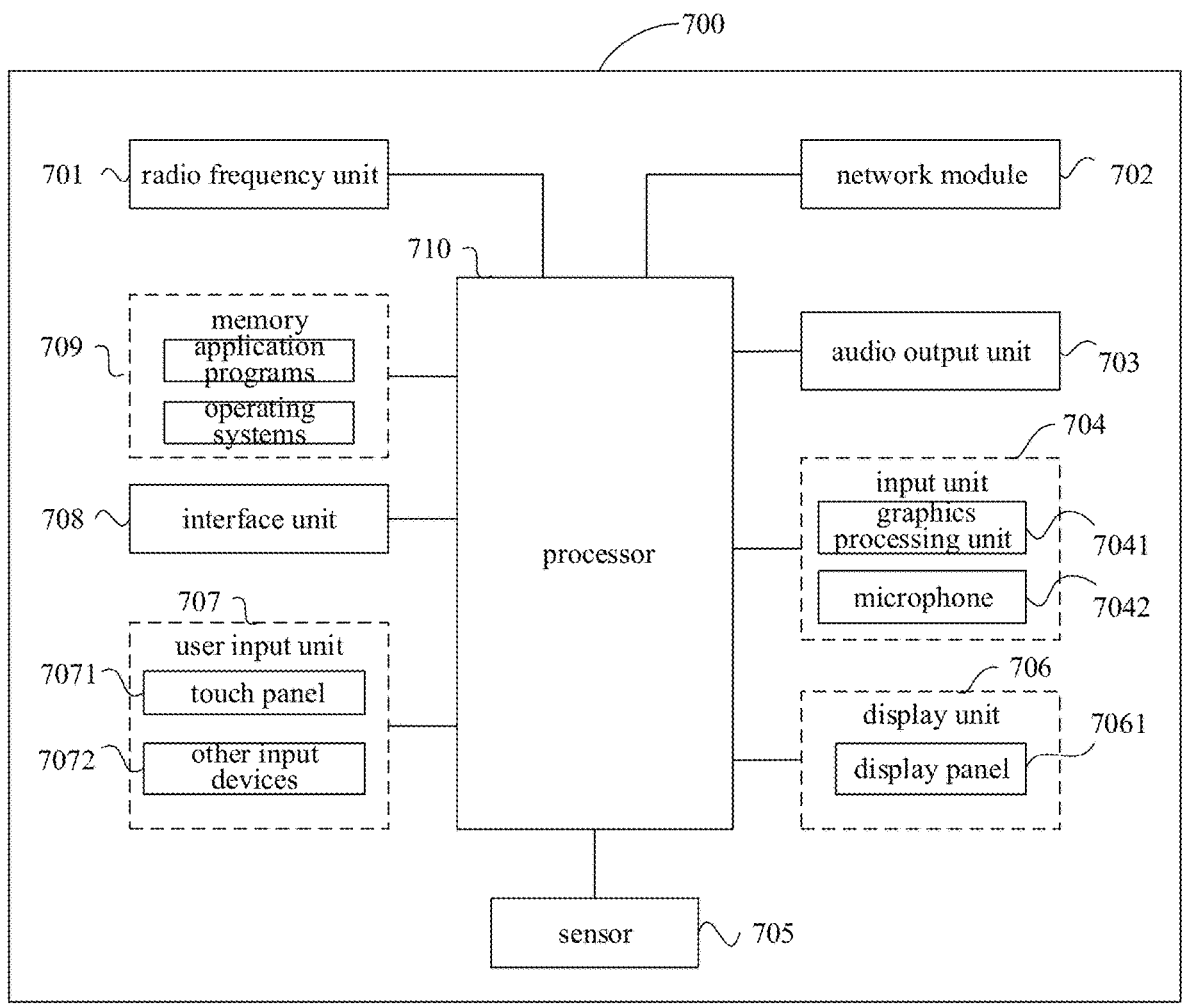
FIG. 7 is a schematic diagram of a hardware structure of an electronic device according to an embodiment of the present application.

FIG. 7 is a schematic diagram of a hardware structure of an electronic device according to an embodiment of the present application.

The electronic device 700 includes but is not limited to: a radio frequency unit 701, a network module 702, an audio output unit 703, an input unit 704, a sensor 705, a display unit 706, a user input unit 707, an interface unit 708, a memory 709, a processor 710, and other components.

Those skilled in the art can understand that the electronic device 700 may also include a power source (such as a battery) for supplying power to various components. The power source may be logically connected to the processor 710 through a power management system, so that the power management system can manage functions such as charging, discharging, and power consumption management. The structure of the electronic device shown in FIG. 7 does not constitute a limitation on the electronic device. The electronic device may include more or fewer components than those shown in the figure, or may combine some components, or may have different component arrangements, which will not be repeated here.

It should be understood that, in the embodiments of the present application, the input unit 704 may include a graphics processing unit (Graphics Processing Unit, GPU) 7041 and a microphone 7042. The graphics processing unit 7041 processes image data of a static picture or a video obtained by an image capture device (such as a camera) in an image capture mode or a video capture mode. The display unit 706 may include a display panel 7061, and the display panel 7061 may be configured in a form of a liquid crystal display, an organic light emitting diode, etc. The user input unit 707 includes a touch panel 7071 and other input devices 7072. The touch panel 7071 is also called a touch screen. The touch panel 7071 may include two parts: a touch detection device and a touch controller. Other input devices 7072 may include, but not limited to, a physical keyboard, a function key (such as a volume control button, a switch button, etc.), a trackball, a mouse, and a joystick, which will not be repeated here. The memory 709 may be used to store software programs and various data, including but not limited to application programs and operating systems. The processor 710 may integrate an application processor and a modem processor, here the application processor mainly processes the operating system, the user interface, and the application programs, and the modem processor mainly processes the wireless communications. It can be understood that the above modem processor may not be integrated into the processor 710.

An embodiment of the present application also provides a readable storage medium having programs or commands stored thereon, and the programs or commands, when executed by a processor, implement each process of the above method for merging the vehicle from the branch road into the main road, and the same technical effect can be achieved. In order to avoid repetition, details are not repeated here.

Here, the processor is the processor in the electronic device described in the above embodiment. The readable storage medium includes a computer readable storage medium, such as a computer read-only memory (Read-Only Memory, ROM), a random access memory (Random Access Memory, RAM), a magnetic disk, or an optical disk.

An embodiment of the present application also provides a chip comprising a processor and a communication interface, wherein the communication interface is coupled with the processor, and the processor is configured to execute programs or commands to implement each process of the above method for merging the vehicle from the branch road into the main road, and the same technical effect can be achieved. In order to avoid repetition, details are not repeated here.

It should be understood that the chip mentioned in the embodiments of the present application may also be referred to as a system-level chip, a system chip, a chip system, or a system-on-chip.

It should be noted that in present application, the terms "include", "comprise" or any other variants thereof are intended to cover non-exclusive inclusion, so that a process, a method, an article or a device including a series of elements not only includes those elements, but also includes other elements not explicitly listed, or elements inherent to the process, the method, the article, or the device. Under a condition that there is no more restriction, the sentence "including an element" does not exclude the existence of other identical elements in the process, the method, the article, or the device that includes the element. In addition, it should be pointed out that the scope of the methods and devices in the embodiments of the present application is not limited to performing functions in the order shown or discussed, and may also include performing functions in a substantially simultaneous manner or in a reverse order according to the functions involved. For example, the described method may be performed in an order different from the described order, and various steps may also be added, omitted, or combined. In addition, features described with reference to certain examples may be combined in other examples.

Through the description of the above embodiments, those skilled in the art can clearly understand that the method of the above embodiments can be implemented by means of software plus the necessary general hardware platform. Of course, it can also be achieved by hardware, but in many cases the former is better. Based on this understanding, the technical solution of the present application or the part that contributes to the existing technology can be embodied in the form of a software product, and the computer software product is stored in a storage medium (such as a ROM/RAM, a magnetic disk, an optical disc), including several commands to make a terminal (which can be a mobile phone, a computer, a server, an air conditioner, or a network device, etc.) execute the method described in the various embodiments of the present application.

The embodiments of the present application are described above with reference to the accompanying drawings, but the present application is not limited to the above specific embodiments. The above specific embodiments are only illustrative and not restrictive. Under the inspiration of the present application, those of ordinary skill in the art can make many changes without departing from the purpose of the present application and the protection scope of the claims, all of which fall within the protection of the present application.

What is claimed is:

1. A method for merging a vehicle from a branch road into a main road, comprising:
   acquiring vehicle information of the vehicle to be merged from the branch road into the main road;
   acquiring traffic flow information of an outer lane of the main road within a preset range of a junction;
   controlling the vehicle to be merged into the main road to merge into the main road based on the traffic flow information of the outer lane of the main road and the vehicle information of the vehicle to be merged into the main road,
   wherein the traffic flow information of the outer lane of the main road comprises gap information of vehicles in the outer lane of the main road and speed information of the vehicles in the outer lane of the main road,
   wherein the vehicle information of the vehicle to be merged into the main road comprises speed information of the vehicle to be merged into the main road, driving type of the vehicle to be merged into the main road, and distance between the vehicle to be merged into the main road and the junction,
   wherein the traffic flow information of the outer lane of the main road further comprises driving types of vehicles in the outer lane of the main road, and
   wherein the method further comprises:
      calculating a time of the vehicle to be merged into the main road arriving at the junction according to the speed information of the vehicle to be merged into the main road and the distance between the vehicle to be merged into the main road and the junction; and
      calculating a scheme of merging the vehicle from the branch road into the main road with a minimum energy consumption according to the time of arriving at the junction, the speed information of the vehicle to be merged into the main road, the drive type of the vehicle to be merged into the main road, the drive types of the vehicles in the outer lane of the main road, and a speed of the vehicles in the outer lane of the main road.

2. The method according to claim 1, wherein controlling the vehicle to be merged into the main road to merge into the main road based on the traffic flow information of the outer lane of the main road and the vehicle information of the vehicle to be merged into the main road comprises:
   acquiring the gap information of the vehicles in the outer lane of the main road;
   controlling the vehicle to be merged into the main road based on the gap information of the vehicles in the outer lane of the main road, so as to merge the vehicle to be merged into the main road into the main road.

3. The method according to claim 2, wherein controlling the vehicle to be merged into the main road based on the gap information of the vehicles in the outer lane of the main road, so as to merge the vehicle to be merged into the main road into the main road comprises:
   controlling, under a condition that the gaps of the vehicles in the outer lane of the main road is greater than or equal to a preset safe merging gap, the vehicles in the outer lane of the main road to keep driving at a constant speed, and controlling the vehicle to be merged into the main road to merge into the main road at the speed of the vehicles in the outer lane of the main road.

4. The method according to claim 2, wherein controlling the vehicle to be merged into the main road based on the gap information of the vehicles in the outer lane of the main road, so as to merge the vehicle to be merged into the main road into the main road further comprises:
   acquiring, under a condition that the gaps of the vehicles in the outer lane of the main road is less than the preset safe merging gap, gap information of vehicles in an inner lane of the main road;
   controlling, under a condition that the gaps of the vehicles in the inner lane of the main road is greater than or equal to a preset safe lane changing gap, the vehicles in the outer lane of the main road to change into the inner lane of the main road, and controlling the vehicle to be merged into the main road to merge into the main road at a speed of the vehicles in the outer lane of the main road.

5. The method according to claim 2, wherein controlling the vehicle to be merged into the main road based on the gap information of the vehicles in the outer lane of the main road, so as to merge the vehicle to be merged into the main road into the main road further comprises:
   controlling, under a condition that the gaps of the vehicles in the outer lane of the main road is greater than or equal to N (N is an integer greater than 1) times a preset safe merging gap, the vehicles in the outer lane of the main road to keep driving at a constant speed, and controlling N vehicles to be merged into the main road to merge into the main road in platoon at the speed of the vehicles in the outer lane of the main road.

6. An electronic device, comprising:
   a processor;
   a memory storing commands executable by the processor, wherein the processor is configured to execute the commands to implement steps of the method for merging a vehicle from a branch road into a main road according to claim 1.

7. A non-transitory storage medium having commands stored thereon, wherein the commands, when executed by a processor of an information processing device or a server, cause the information processing device or the server to implement steps of the method for merging a vehicle from a branch road into a main road according to claim 1.

8. A chip comprising a processor and a communication interface, wherein the communication interface is coupled with the processor, and the processor is configured to execute programs or commands to implement steps of the method for merging a vehicle from a branch road into a main road according to claim 1.

9. A device for merging a vehicle from a branch road into a main road, comprising:
   an acquisition module configured to acquire vehicle information of the vehicle to be merged from the branch road into the main road;
   the acquisition module further configured to acquire traffic flow information of an outer lane of the main road within a preset range of a junction;

a control module configured to control the vehicle to be merged into the main road to merge into the main road based on the traffic flow information of the outer lane of the main road and the vehicle information of the vehicle to be merged into the main road, wherein the traffic flow information of the outer lane of the main road comprises gap information of vehicles in the outer lane of the main road and speed information of the vehicles in the outer lane of the main road, wherein the vehicle information of the vehicle to be merged into the main road comprises speed information of the vehicle to be merged into the main road, driving type of the vehicle to be merged into the main road, and distance between the vehicle to be merged into the main road and the junction, wherein the traffic flow information of the outer lane of the main road further comprises driving types of vehicles in the outer lane of the main road, and wherein the device is configured to:

calculate a time of the vehicle to be merged into the main road arriving at the junction according to the speed information of the vehicle to be merged into the main road and the distance between the vehicle to be merged into the main road and the junction; and calculate a scheme of merging the vehicle from the branch road into the main road with a minimum energy consumption according to the time of arriving at the junction, the speed information of the vehicle to be merged into the main road, the drive type of the vehicle to be merged into the main road, the drive types of the vehicles in the outer lane of the main road, and a speed of the vehicles in the outer lane of the main road.

\* \* \* \* \*

UNITED STATES PATENT AND TRADEMARK OFFICE
CERTIFICATE OF CORRECTION

| | | |
|---|---|---|
| PATENT NO. | : 12,091,015 B2 | |
| APPLICATION NO. | : 17/623858 | |
| DATED | : September 17, 2024 | |
| INVENTOR(S) | : Keqiang Li et al. | |

It is certified that error appears in the above-identified patent and that said Letters Patent is hereby corrected as shown below:

On the Title Page

Item (73), Assignee section, following Beijing (CN), add the text --Tsinghua University, Beijing (CN)--

Signed and Sealed this
Twelfth Day of November, 2024

Katherine Kelly Vidal
*Director of the United States Patent and Trademark Office*